United States Patent [19]

Ushio et al.

[11] Patent Number: 5,210,126
[45] Date of Patent: May 11, 1993

[54] SILICONE RUBBER COMPOSITION AND METHOD FOR THE PRODUCTION OF SILICONE RUBBER MOLDINGS

[75] Inventors: Yoshito Ushio; Akito Nakamura, both of Chiba, Japan

[73] Assignee: Dow Corning Toray Silicone Co., Ltd., Tokyo, Japan

[21] Appl. No.: 676,123

[22] Filed: Mar. 27, 1991

[30] Foreign Application Priority Data

Mar. 30, 1990 [JP] Japan ................................. 2-83985

[51] Int. Cl.$^5$ ............................................ C08L 75/00
[52] U.S. Cl. ...................................... 524/588; 528/15; 528/24; 523/212; 264/5; 264/331.11
[58] Field of Search ..................... 528/15, 24; 524/588; 523/212; 264/331/11, 5

[56] References Cited

U.S. PATENT DOCUMENTS 4,144,206 3/1979 Symeon ................................. 528/24
4,322,320 3/1982 Caprino ................................. 528/24

OTHER PUBLICATIONS

Chemical Abstracts vol. 93, No. 18, Nov. 3, 1980, p. 63, Abstract No. 169446f, Columbia Ohio, JP-A5580461 (Shinetsu Kagaku Kogyo).
Denki Tsushin Gakkai Gijutsa Kenkyu Hokoku, 16 (226) pp. 29-38 (1977).

*Primary Examiner*—Melvyn I. Marquis
*Attorney, Agent, or Firm*—Roger H. Borrousch

[57] ABSTRACT

A silicone rubber composition is prepared by mixing a diorganopolysiloxane which contains 0.1 to 5 weight % of low-molecular-weight organosiloxane with a vapor pressure at 200° C. of at least 10 mm Hg, with at least 90 weight % of a low-molecular-weight organosiloxane with a boiling point not exceeding 250° C. at 760 mm Hg and a curing agent with filler being optional. These silicone rubber compositions are useful for silicone rubber moldings which can be used to in applications involving electrical switch contacts resulting in electrical switch contact conduction free of defects.

5 Claims, No Drawings

SILICONE RUBBER COMPOSITION AND METHOD FOR THE PRODUCTION OF SILICONE RUBBER MOLDINGS

BACKGROUND OF THE INVENTION

1. Technical Field

The present invention relates to a silicone rubber composition which evidences an excellent moldability, which can be molded without the use of special molds into silicone rubber moldings whose dimensions are the same as for the use of a conventional silicone rubber composition, which supports the facile removal of low-molecular-weight organosiloxane after molding, and which provides silicone rubber moldings which are free of the problems associated with low-molecular-weight organosiloxane, for example, defective conduction at electrical switch contacts and so forth. The present invention also relates to a method for the production of the aforesaid silicone rubber moldings.

2. Prior Art

Diorganopolysiloxane-based silicone rubber compositions offer a good heat resistance, cold resistance, and chemical resistance, as well as, an excellent electrical insulation, and as a consequence are used in a wide variety of electrical equipment and devices as a heat-resistant insulating material. Moreover, these compositions are used in electrical equipment as conductive materials through the addition to them of electrically conductive filler. However, the moldings obtained from such silicone rubber compositions exercise a negative influence on electrical switch contacts which may be present nearby and in fact often cause conduction faults at electrical contacts. The following mechanism has been reported for this phenomenon: residual low-molecular-weight organosiloxane in the silicone rubber molding evaporates, either at room temperature or upon heating; this gas, upon reaching an electrical switch contact, is exposed to the discharge energy associated with operation of the contact; and chemical transformations are induced which result in the formation of insulating substances such as silicon dioxide and silicon carbide, see Denki Tsushin Gakkai Gijutsu Kenkyu Hokoku, 76 (226) pp. 29–38 (1977).

In one method for suppressing the defective conduction at electrical switch contacts which is caused by this low-molecular-weight organosiloxane gas, the molding prepared by the thermal cure (primary vulcanization) of an ordinary silicone rubber composition is subjected to a secondary vulcanization for completion of the cure at a temperature higher than the 150° C. to 220° C. used in ordinary secondary vulcanization for a period of time longer than the 1 to 12 hours in ordinary secondary vulcanization in order to remove the low-molecular-weight siloxane present in the molding. In addition, investigations have been conducted into methods for obtaining silicone rubber moldings which do not cause conduction faults at electrical contacts through the use of silicone rubber compositions based on diorganopolysiloxane which has been depleted of low-molecular-weight organosiloxane.

However, in the former approach, since it is difficult to accomplish the satisfactory removal of low-molecular-weight organosiloxane from silicone rubber moldings using ordinary or conventional secondary vulcanization conditions, heat treatment at high temperatures (220° C. to 270° C.) for long periods of time (at least 24 hours) is required in order to remove low-molecular-weight organosiloxane to a degree which eliminates defective electrical contact conduction. This accrues the disadvantages of a reduction in productivity and an increase in product cost.

In the latter approach, when the silicone rubber compositions which are employed by this method are processed in those molds used heretofore for silicone rubber molding, moldings are obtained which have dimensions larger than those of the target molding. As a consequence, there have been attempts at the production of moldings with the same dimensions as before through the design and production of new, dedicated molds which are suitable only for such silicone rubber compositions. However, this approach entails cost disadvantages due to its requirements for new equipment investment.

PROBLEMS TO BE SOLVED BY THE INVENTION

The present inventors carried out extensive investigations directed at solving the aforementioned problems. It was found that the problem as described above for silicone rubber compositions based on diorganopolysiloxane depleted of low-molecular-weight organosiloxane may be attributed to the fact that the linear shrinkage coefficient for the silicone rubber molding after secondary vulcanization is much smaller than the linear shrinkage coefficient after secondary vulcanization for silicone rubber moldings obtained from ordinary or conventional silicone rubber compositions.

SUMMARY OF THE INVENTION

It was also found that the aforementioned problems could be solved by the introduction of specific low-boiling, low-molecular-weight organosiloxane (one type of low-molecular-weight organosiloxane) into a silicone rubber composition which is based on diorganopolysiloxane depleted of low-molecular-weight organosiloxane. The present invention was developed based on these findings.

In other words, the present invention takes as its object the introduction of a silicone rubber composition which affords moldings which have the same dimensions as prior silicone rubber moldings even when molding is executed using conventional molds intended for silicone rubber molding, and, moreover, which generates silicone rubber moldings free of such problems as electrical switch contact conduction defects. A further object of the present invention is the introduction of a method for the preparation of silicone rubber moldings which are free of such problems as electrical switch contact conduction defects.

MEANS SOLVING THE PROBLEMS AND FUNCTION THEREOF

The aforesaid objects are achieved by a silicone rubber composition which comprises
(A) 100 weight parts diorganopolysiloxane which contains 0.1 to 5 weight % low-molecular-weight organosiloxane whose vapor pressure at 200° C. is at least 10 mm Hg, wherein at least 90% of the aforesaid low-molecular-weight organosiloxane comprises organosiloxane with a boiling point not exceeding 250° C. at 760 mm Hg,
(B) 0 to 300 weight parts filler, and (C) curing agent in a quantity sufficient to cure the present composition.

DESCRIPTION OF THE PREFERRED EMBODIMENTS

To explain the preceding in greater detail, the diorganopolysiloxane comprising component (A) must contain 0.1 to 5 weight % low-molecular-weight organosiloxane with a vapor pressure of at least 10 mm Hg at 200° C. When this value falls below 0.1 weight %, the linear shrinkage ratio after secondary vulcanization becomes too small, while values in excess of 5 weight % make it difficult to remove the low-molecular-weight organosiloxane during secondary vulcanization. This low-molecular-weight organosiloxane with vapor pressure of at least 10 mm Hg at 200° C. takes the form of cyclic diorganosiloxanes as follows $$[(CH_3)_2SiO]_n$$

wherein n is an integer with a value of 3 to 25, these cyclic diorganosiloxanes in which a portion of the methyl is replaced by another organic group(s), straight-chain diorganosiloxanes as follows $$CH_3[(CH_3)_2SiO]_mSi(CH_3)_3$$

wherein m is an integer with a value of 1 to 25, and these straight-chain diorganosiloxanes in which a portion of the methyl is replaced by another organic group(s).

It is also essential with respect to this component (A) that at least 90% of the aforesaid low-molecular-weight organosiloxane have a boiling point (760 mm Hg) not exceeding 250° C. It is difficult to remove the low-molecular-weight organosiloxane during secondary vulcanization when the quantity of low-molecular-weight organosiloxane with $bp_{760} \leq 250°$ C. falls below 90 weight %. This low-molecular-weight organosiloxane with $bp_{760} \leq 250°$ C. is exemplified by
hexamethylcyclotrisiloxane,
octamethylcyclotetrasiloxane,
decamethylcyclopentasiloxane,
dodecamethylcyclohexasiloxane,
$(CH_3)_3SiOSi(CH_3)_3$,
$(CH_3)_3SiO[(CH_3)_2SiO]Si(CH_3)_3$,
$(CH_3)_3SiO[(CH_3)_2SiO]_2Si(CH_3)_3$,
$(CH_3)_3SiO[(CH_3)_2SiO]_3Si(CH_3)_3$, and so forth.

Component (A) may have either a straight-chain or branched chain molecular structure, and its degree of polymerization (DP) should correspond to viscosities of 100 centipoise to 100,000,000 centipoise. The high-DP diorganopolysiloxanes known as silicone gums are preferred here. The diorganopolysiloxane under consideration is exemplified as follows:
dimethylvinylsiloxy-terminated dimethylpolysiloxanes,
dimethylvinylsiloxy-terminated dimethylsiloxanemethylvinylsiloxane copolymers,
trimethylsiloxy-terminated dimethylsiloxanemethylvinylsiloxane copolymers, and
dimethylvinylsiloxy-terminated dimethylsiloxanemethylphenylsiloxane-methylvinylsiloxane copolymers.

Within the present context, the content of low-molecular-weight organosiloxane can be measured by solvent extraction of the low-molecular-weight organosiloxane from the diorganopolysiloxane followed by analysis of its extracted quantity by gas chromatography.

Component (A) can be prepared, for example, by (a) the removal of low-molecular-weight organosiloxane as described above from diorganopolysiloxane prepared by equilibration polymerization according to known methods, to afford diorganopolysiloxane which contains no more than 0.3 weight % low-molecular-weight organosiloxane with vapor pressure of at least 10 mm Hg at 200° C., (b) and by then admixing low-molecular-weight organosiloxane with $bp_{760} \leq 250°$ C. as described above.

Numerous methods are available for removing low-molecular-weight organosiloxane with vapor pressure of at least 10 mm Hg at 200° C. from diorganopolysiloxane obtained by equilibration polymerization, and the optimal methodology varies with the type of organopolysiloxane. For example, in the case of relatively low viscosity straight-chain diorganosiloxanes, the low-molecular-weight organosiloxane can be removed by stripping or extraction. In the former approach, the organopolysiloxane is converted into a thin film and stripped by heating to 180° C. to 300° C. in vacuo (below 0.5 mm Hg). In the latter technique, the low-molecular-weight organosiloxane is extracted by addition to the diorganopolysiloxane of organic solvent which dissolves the low-molecular-weight organosiloxane but which does not dissolve high-molecular-weight organosiloxane, for example, organic solvents such as methanol, ethanol, etc. In the case of high viscosities, the diorganopolysiloxane is first dissolved in toluene, and methanol, ethanol, etc., is then added in order to precipitate the high-molecular-weight organosiloxane. The low-molecular-weight organosiloxane can then be separated from the upper solvent phase layer into which it is extracted. The residual organic solvent in the high-molecular-weight organosiloxane can be removed, for example, by stripping, etc.

Component (B) comprises filler, which is added on an optional basis in order to impart a prescribed hardness and strength to the silicone rubber composition. It is exemplified by carbon black, quartz micropowder, fumed silica, precipitated silica, and these silicas whose surfaces have been treated with organohalosilane, organodisilazane, or low-DP organosiloxane. This component should be added at 0 to 300 weight parts.

Component (C) is the component which brings about curing of the composition of the present invention, and it generally takes the form of an organoperoxide or the combination of organohydrogenpolysiloxane with a platinum-type compound catalyst. Here, the organoperoxide is exemplified by
dicumyl peroxide,
di-tert-butyl peroxide,
2,5-dimethyl-2,5-di(tert-butylperoxy)hexane,
1,1-bis(tert-butylperoxy)-3,3,5-trimethylcyclohexane,
benzoyl peroxide,
2,4-dichlorobenzoyl peroxide, and
para-chlorobenzoyl peroxide.

The organohydrogenpolysiloxane under consideration has the following general formula $$R_cH_dSiO_{(4-c-d)/2}$$

wherein R is a monovalent hydrocarbon group, for example, an alkyl group such as methyl, ethyl, propyl, etc., or an aryl group such as phenyl, etc.; c has a value of 0 to 3, d has a value of 1 to 3, and c+d has a value of 1 to 3. Its molecular structure may be straight chain, branched chain, cyclic, or network. While its degree of polymerization is not specifically restricted, its viscosity at 25° C. will generally fall within the range of 1 to 10,000 centistokes.

The platinum-type compound is exemplified by finely divided platinum, finely divided platinum adsorbed on carbon powder, chloroplatinic acid, alcohol-modified chloroplatinic acid, the diketone chelate compounds of platinum, chloroplatinic acid/olefin coordination compounds, and chloroplatinic acid/divinyltetramethyldisiloxane coordination compounds. Component (C) should be added in a quantity sufficient to bring about curing of the composition of the present invention. For organoperoxides, this will generally fall within the range of 0.05 to 10 weight parts per 100 weight parts component (A). Organohydrogenpolysiloxane is generally added in a quantity which provides 0.5 to 10 moles silicon-bonded hydrogen atoms in the organohydrogenpolysiloxane per 1 mole vinyl groups in component (A). Finally, the platinum-type compound is generally deployed at 0.1 to 100 weight parts as platinum metal per 1,000,000 weight parts component (A).

The silicone rubber composition of the present invention consists of the aforementioned components (A), (B), and (C), but heat stabilizers, flame retardants, pigments, etc., may be introduced as necessary or desired. Moreover, when the silicone rubber composition under consideration cures through an addition reaction employing a platinum-type compound catalyst, it is permissible also to introduce a curing retarder such as 3-methyl-1-butyn-3-ol, 3,5-dimethyl-1-hexyn-3-ol, 3-methyl-3-pentene-1-yne, 3,5-dimethyl-3-hexene-1-yne, and methylvinylsiloxane cyclics.

The composition of the present invention can be prepared by mixing prescribed quantities of components (A) through (C) or components (A) and (C) using, for example, a two-roll mill, kneader, Banbury mixer, and so forth.

Silicone rubber moldings free of the problems originating with low-molecular-weight organosiloxane (e.g., defective conduction at electrical switch contacts, etc.) can be produced by the following method from the silicone rubber composition according to the present invention as disclosed hereinbefore. That is, such silicone rubber moldings are produced by a method which is characterized by filling a silicone rubber composition comprising (A) 100 weight parts diorganopolysiloxane which contains 0.1 to 5 weight % low-molecular-weight organosiloxane whose vapor pressure at 200° C. is at least 10 mm Hg, wherein at least 90% of this low-molecular-weight organosiloxane has $bp_{760} \leq 250°$ C., (B) 0 to 300 weight parts filler, and (C) curing agent in a quantity sufficient to cure the present composition, into a mold and thermally curing same in order to form a silicone rubber molding, and by subsequently removing the above-described low-molecular-weight organosiloxane with $bp_{760} \leq 250°$ C. by heating this molding at 150° C. to 250° C.

To explain this method in greater detail, the components (A), (B), and (C) specified immediately above are in each case identical with the components (A), (B), and (C) described earlier. In this method, the silicone rubber composition as described above is filled into a mold intended for the molding of silicone rubber and thermally cured in order to form a silicone rubber molding. The mold used here need not be a special mold, but rather may simply take the form of those molds ordinarily used for the molding of silicone rubbers. The molding is then heated in order to remove the low-molecular-weight organopolysiloxane with $bp_{760} \leq 250°$ C., but the heating temperature and heating time used here again can be within those ranges associated with ordinary secondary vulcanization conditions. As a general matter, the heating temperature will be 150° C. to 250° C. and the heating time will be 1 to 12 hours.

The curable silicone rubber composition according to the present invention as described above has an excellent moldability, and, in particular, its linear shrinkage ratio after removal of low-molecular-weight organosiloxane by secondary vulcanization after primary vulcanization is the same as the corresponding linear shrinkage ratio of ordinary silicone rubber compositions. This feature makes it possible to obtain highly dimensionally accurate silicone rubber moldings even using conventional molds for silicone rubber molding. Moreover, as it is very easy to remove the low-molecular-weight organosiloxane from silicone rubber moldings obtained from the present invention's curable silicone rubber composition, this composition is therefore adapted for the production of silicone rubber moldings which are free of such problems as conduction faults at electrical switch contacts.

The present invention will be explained in greater detail through the following illustrative examples, in which parts = weight parts, the viscosity is the value at 25° C., and cs = centistokes. The content of low-molecular-weight organosiloxane and the linear shrinkage ratio were measured as follows.

METHOD FOR MEASURING THE CONTENT OF LOW-MOLECULAR-WEIGHT ORGANOSILOXANE

A 1.00 g sample was first immersed in 10 mL carbon tetrachloride for 12 hours, and n-undecane was then added as internal standard to afford an extract. This extract was subjected to gas chromatographic analysis in order to determine its content of low-molecular-weight organosiloxane. The instrument used was a GC-9APF from Shimadzu.

METHOD FOR MEASURING THE LINEAR SHRINKAGE RATIO

In Example 1, these measurements were conducted according to JIS K 2123.

In Example 2, these measurements were also conducted according to JIS K 2123, with the exception that the sample was molded using a 130×130 mm mold with a depth of 4 mm.

EXAMPLE 1

A dimethylvinylsiloxy-terminated dimethylpolysiloxanetype gum (average DP=3,000, 99.8 mole % dimethylsiloxane units, 0.2 mole % methylvinylsiloxane units) prepared by a potassium silanolate-catalyzed equilibration polymerization technique was heated in vacuo to afford a dimethylvinylsiloxy-terminated dimethylsiloxane-methylvinylsiloxane copolymer gum which contained 0.2 weight % low-molecular-weight organosiloxane with a vapor pressure of at least 10 mm Hg at 200° Low-molecular-weight organosiloxane with $bp_{760} \leq 250°$ C. accounted for 58 weight percent of this gum's low-molecular-weight organosiloxane with a vapor pressure of at least 10 mm Hg at 200° C. 100 Parts of the obtained dimethylpolysiloxane-type gum, 4 parts dimethylhydroxysiloxy-terminated dimethylpolysiloxane (viscosity = 400 cs), and 40 parts wet-method silica were first mixed to homogeneity using a kneader mixer and then additionally hot mixed for 2 hours at 170° C. to give a silicone rubber base. A silicone rubber composition was then prepared by the addition, with mixing to homogeneity, of 0.9 parts octamethylcyclotetrasiloxane ($bp_{760}=175°$ C.) and 0.5 parts 2,5-dimethyl-2,5-di(tert-butylperoxy)-hexane to 100 parts of this silicone rubber base. The diorganopolysiloxane comprising component (A) was extracted from this silicone rubber composition, and the quantity of low-molecular-weight organosiloxane with a vapor pressure of at least 10 mm Hg at 200° C. was measured. Its content was 0.8 weight percent, of which 92 weight percent was low-molecular-weight organosiloxane with $bp_{760} \leq 250°$ C. This composition was press molded for 10 minutes at 170° C. and 25 kg/cm² to give a 2 mm-thick rubber sheet molding (primary vulcanizate). This primary vulcanizate was subsequently heated at 200° C. in a hot air-circulation oven, and its content of low-molecular-weight organosiloxane and linear shrinkage ratio were measured at one hour intervals. These measurement results are reported in Table 1.

For comparison, a silicone rubber composition was prepared as above, but without addition of the octamethylcyclotetrasiloxane. This silicone rubber composition was evaluated as above, and these measurement results are also reported in Table 1 as Comparison Example 1.

Also for comparison, a silicone rubber composition was prepared by operating as above, but with the following exceptions: the octamethylcyclotetrasiloxane was not used, and the above dimethylpolysiloxane-type gum containing 0.2 weight % low-molecular-weight organosiloxane was replaced with a dimethylvinylsiloxy-terminated dimethylpolysiloxane-type gum (average DP=3,000, 99.8 mole % dimethylsiloxane units, 0.2 mole % methylvinylsiloxane units) which contained 0.9 weight % low-molecular-weight organosiloxane with a vapor pressure of at least 10 mm Hg at 200° C. (65 weight percent of this had $bp_{760} \leq 250°$ C. This silicone rubber composition was evaluated as above, and its measurement results are reported in Table 1 as Comparison Example 2.

TABLE 1

| | (Sample thickness = 2 mm) | | |
|---|---|---|---|
| HEATING TIME (hours) | PRESENT INVENTION | COMPARISON EXAMPLE 1 | COMPARISON EXAMPLE 2 |
| 0 | 0.8100 (2.8%) | 0.1100 (2.7%) | 0.6300 (2.8%) |
| 1 | 0.0060 (3.2%) | 0.0060 (2.8%) | 0.0360 (3.1%) |
| 2 | 0.0000 (3.2%) | 0.0000 (2.8%) | 0.0060 (3.2%) |
| 3 | — | — | 0.0020 (3.2%) |
| 4 | — | — | 0.0000 (3.2%) |

Note: The numbers outside the parentheses report the content of low-molecular-weight organosiloxane, while the numbers within the parentheses report the linear shrinkage ratio.

The silicone rubber composition according to the present invention required a heating time of 2 hours (secondary vulcanization time) for the complete removal of low-molecular-weight organosiloxane, and it had a linear shrinkage ratio of 3.2% at the point at which the low-molecular-weight organosiloxane had been removed. In contrast to this, the silicone rubber composition of Comparison Example 2, which corresponded to an ordinary or conventional silicone rubber composition, required heating for 4 hours at 200° C. to achieve complete removal of low-molecular-weight organosiloxane. It had a linear shrinkage ratio of 3.2% at the point at which the low-molecular-weight organosiloxane had been removed, a value equal to that for the present invention. The silicone rubber composition of Comparison Example 1 represented the silicone rubber composition of the present invention from which the octamethylcyclotetrasiloxane had been omitted. Its secondary vulcanization time required for removal of low-molecular-weight organosiloxane was 2 hours, half that required for Comparison Example 2. However, it had a linear shrinkage ratio of 2.8% after removal of the low-molecular-weight organosiloxane, which amounted to a difference of 0.4% from the 3.2% observed for the present invention and Comparison Example 2.

EXAMPLE 2

A dimethylvinylsiloxy-terminated dimethylsiloxane-type gum (average DP=3,000, 99.9 mole % dimethylsiloxane units, 0.1 mole % methylvinylsiloxane units) prepared by a potassium silanolate-catalyzed equilibration polymerization technique was stripped to afford a dimethylvinylsiloxy-terminated dimethylpolysiloxane-type gum which contained 0.2 weight % low-molecular-weight organosiloxane with a vapor pressure of at least 10 mm Hg at 200° C. Low-molecular-weight organosiloxane with $bp_{760} \leq 250°$ C. accounted for 58 weight percent of this gum's low-molecular-weight organosiloxane with a vapor pressure of at least 10 mm Hg at 200° C. 100 Parts of the obtained dimethylpolysiloxane-type gum, 3 parts dimethylhydroxysiloxy-terminated dimethylpolysiloxane (viscosity=40 cs), and 30 parts wet-method silica were first mixed to homogeneity using a kneader mixer and then additionally hot mixed for 2 hours at 170° C. to give a silicone rubber base. A silicone rubber composition was then prepared by the addition, with mixing to homogeneity, of 1.1 parts octamethylcyclotetrasiloxane ($bp_{760}=175°$ C.), 0.3 parts trimethylsiloxy-terminated dimethylsiloxanemethylhydrogensiloxane copolymer with the following formula

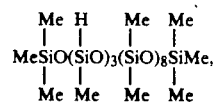

chloroplatinic acid sufficient to give 10 ppm as platinum, and 0.077 parts methyltris(3-methyl-1-butyn-3-oxy)silane as curing reaction inhibitor to 100 parts of this silicone rubber base. The diorganopolysiloxane comprising component (A) was extracted from this silicone rubber composition, and the quantity of low-molecular-weight organosiloxane with a vapor pressure of at least 10 mm Hg at 200° C. was measured. Its content was 0.9 weight percent, of which 93 weight percent was low-molecular-weight organosiloxane with $bp_{760} \leq 250°$ C. This composition was press molded for 10 minutes at 170° C. and 25 kg/cm² to give a 4 mm-thick rubber sheet molding (primary vulcanizate). This primary vulcanizate was then heated at 200° C. in a hot air-circulation oven, and its content of low-molecular-weight organosiloxane and linear shrinkage ratio were measured at two hour intervals. These measurement results are reported in Table 2. For comparison, a silicone rubber composition was prepared as above, but without the addition of octamethylcyclotetrasiloxane. Also, a silicone rubber composition was prepared by operating as above, but with the following exceptions: the octamethylcyclotetrasiloxane was not added, and the above dimethylpolysiloxane-type gum containing 0.2 weight % low-molecular-weight organosiloxane was replaced with a dimethylpolysiloxane-type gum (average DP=3,000, 99.9 mole % dimethylsiloxane units, 0.1 mole % methylvinylsiloxane units) which contained 0.9 weight % low-molecular-weight organosiloxane with a vapor pressure of at least 10 mm Hg at 200° C. (65 weight percent of this had $bp_{760} \leq 250°$ C. The properties of these compositions were measured as above, and these measurement results are reported in Table 2 as Comparison Example 3 and Comparison Example 4.

TABLE 2

| | (Sample thickness = 4 mm) | | |
|---|---|---|---|
| HEATING TIME (hours) | PRESENT INVENTION | COMPARISON EXAMPLE 1 | COMPARISON EXAMPLE 2 |
| 0 | 0.8500 (3.1%) | 0.1200 (3.0%) | 0.6500 (3.1%) |
| 2 | 0.0800 (3.4%) | 0.0140 (3.1%) | 0.1000 (3.4%) |
| 4 | 0.0000 (3.5%) | 0.0000 (3.1%) | 0.0130 (3.5%) |
| 6 | — | — | 0.0040 (3.5%) |
| 8 | — | — | 0.0000 (3.5%) |

Note: The numbers outside the parentheses report the content of low-molecular-weight organosiloxane, while the numbers within the parentheses report the linear shrinkage ratio.

The silicone rubber composition of Comparison Example 4, which corresponded to an ordinary or conventional silicone rubber composition, required an 8-hour secondary vulcanization at 200° C. for removal of the low-molecular-weight organosiloxane, and it had a linear shrinkage ratio of 3.5% at the point at which the low-molecular-weight organosiloxane had been removed. The silicone rubber composition according to the present invention required a secondary vulcanization time of 4 hours for removal of the low-molecular-weight organosiloxane, and it had a linear shrinkage ratio of 3.5% at the point at which the low-molecular-weight organosiloxane had been removed. The silicone rubber composition of Comparison Example 3 also required 4 hours of secondary vulcanization for removal of the low-molecular-weight organosiloxane, but it had a linear shrinkage ratio of 3.1% at the point at which the low-molecular-weight organosiloxane had been removed. This represented a difference of 0.4% from the 3.5% for the silicone rubber composition of Comparison Example 4.

EFFECTS OF THE INVENTION

Because the silicone rubber composition according to the present invention consists of components (A) through (C) or components (A) and (C), it is characterized by the following features: it affords silicone rubber moldings with the same dimensions as silicone rubber moldings prepared from prior silicone rubber compositions even by molding using an ordinary or conventional mold for silicone rubber molding as used heretofore; and removal of low-molecular-weight organosiloxane during secondary vulcanization after molding in a mold is extremely easy.

That which is claimed is:

1. A silicone rubber composition comprising
   (A) 100 weight parts diorganopolysiloxane which contains 0.1 to 5 weight % low-molecular-weight organosiloxane whose vapor pressure at 200° C. is at least 10 mm Hg, wherein at least 90 weight % of this low-molecular-weight organosiloxane comprises low-molecular-weight organosiloxane with a boiling point not exceeding 250° C. at 760 mm Hg
   (B) 0 to 300 weight parts filler, and
   (C) curing agent in a quantity sufficient to cure the composition wherein the curing agent is an organoperoxide or a combination of organohydrogenpolysiloxane with a platinum catalyst.

2. The silicone rubber composition according to claim 1 in which the diorganopolysiloxane is obtained by
   (a) the removal of low-molecular-weight organosiloxane which has a vapor pressure of at least 10 mm Hg at 200° C. from diorganopolysiloxane prepared by equilibration polymerization to afford a diorganopolysiloxane which contains no more than 0.3 weight % of said low-molecular-weight organosiloxane,
   (b) and by then admixing 0.1 to 5 weight parts low-molecular-weight organosiloxane with $bp_{760} \leq 250°$ C. per 100 weight parts of the aforesaid diorganopolysiloxane.

3. The silicone rubber composition according to claim 1 in which the organosiloxane with $bp_{760} \leq 250°$ C. is selected from the group consisting of
   octamethylcyclotetrasiloxane,
   decamethylcyclopentasiloxane,
   dodecamethylcyclohexasiloxane, and
   mixtures thereof.

4. A method for the production of silicone rubber moldings wherein said method comprises filling a silicone rubber composition comprising
   (A) 100 weight parts diorganopolysiloxane which contains 0.1 to 5 weight % low-molecular-weight organosiloxane whose vapor pressure at 200 degrees Centigrade is at least 10 mm Hg, wherein at least 90% of this low-molecular-weight organosiloxane has $bp_{760} \leq 250°$ C.,
   (B) 0 to 300 weight parts filler, and
   (C) curing agent in a quantity sufficient to cure the composition
      into a mold and thermally curing same in order to form a silicone rubber molding, and
      removing the aforesaid low-molecular-weight organosiloxane with $bp_{760} \leq 250°$ C. by heating this molding at 150° C. to 250° C.

5. A molding obtained by the method of claim 4.

* * * * *